United States Patent [19]
Gong

[11] Patent Number: 6,047,377
[45] Date of Patent: Apr. 4, 2000

[54] TYPED, PARAMETERIZED, AND EXTENSIBLE ACCESS CONTROL PERMISSIONS

[75] Inventor: Li Gong, Menlo Park, Calif.

[73] Assignee: Sun Microsystems, Inc., Palo Alto, Calif.

[21] Appl. No.: 08/988,857

[22] Filed: Dec. 11, 1997

[51] Int. Cl.⁷ .................................................. G06F 15/163
[52] U.S. Cl. ........................... 713/201; 709/217; 709/225
[58] Field of Search .................... 713/200, 201; 709/217–219, 225, 226, 302–304

[56] References Cited

U.S. PATENT DOCUMENTS

| | | | |
|---|---|---|---|
| 4,919,545 | 4/1990 | Yu | 380/25 |
| 5,261,102 | 11/1993 | Hoffman | 395/700 |
| 5,311,591 | 5/1994 | Fischer | 380/4 |
| 5,421,011 | 5/1995 | Camillone et al. | 395/650 |
| 5,577,252 | 11/1996 | Nelson et al. | 395/670 |
| 5,742,759 | 4/1998 | Nessett et al. | 395/187.01 |
| 5,761,498 | 6/1998 | Ooe et al. | 395/610 |
| 5,781,633 | 7/1998 | Tribble et al. | 380/25 |
| 5,787,427 | 7/1998 | Benantar et al. | 707/9 |
| 5,815,657 | 9/1998 | Williams et al. | 395/186 |

FOREIGN PATENT DOCUMENTS

| | | | |
|---|---|---|---|
| 2259590A | 3/1993 | WIPO | G06F 9/44 |
| 2308688A | 7/1997 | WIPO | G06F 12/14 |

OTHER PUBLICATIONS

Gong Li, et al.: "*Going Beyond the Sandbox: An Overview of the New Security Architecture in the Java™ Development Kit 1.2*", Proceedings of the Usenix Symposium on Internet Technologies and Systems, Monterey, CA, USA, Dec. 8–11, 1997, ISBN 1–880446–91–S, 1997, Berkeley, CA, USA, Usenix Assoc., USA, pp. 103–112, XP002100907.

Wallach, D. S., et al.: "*Extensible Security Architecture for Java*", 16th ACM Symposium on Operating Systems Principles, Sain Malo, France, Oct. 5–8, 1997, ISSN 0163–5980, Operating Systems Review, Dec. 1997, ACM, USA, pp. 116–128, XP–0021010681.

Dean, D., et al., "Java Security: From HotJava to Netscape and Beyond," Proceedings of the 1996 IEEE Symposium on Security and Privacy, Oakland, CA, May 6–8, 1996.

Hamilton, M.A., "Java and the Shift to Net–Centric Computing," Computer, vol. 29, No. 8, Aug. 1996.

*Primary Examiner*—Ayaz R. Sheikh
*Assistant Examiner*—Jigar Pancholi
*Attorney, Agent, or Firm*—McDermott, Will & Emery

[57] ABSTRACT

A method and apparatus for establishing and maintaining complex security rules is provided. The security rules are established through the use of "permission" classes that take advantage of the power and simplicity various features of object oriented programming, including the ability to inherit attributes and methods. For example, a permission super class is established that defines an interface to a validation method. A permission subclass may then be created which provides an implementation of the validation method. When invoked, the validation method indicates whether a given permission represented by one object belonging to a permission class encompasses the permission represented by another object belonging to a permission class. Classes are also provided for grouping permissions into sets, and for establishing protection domains for classes of objects.

24 Claims, 7 Drawing Sheets

Policy File 444

| permission | file://somesource | somekey | TV | "watch" | "channel-5" |
| permission | file://othersource | somekey | TV | "disenable" | "channel 5" |
| | | | | | |
| permission | http://www.source.com | lastkey | FilePermission | "write" | "/tmp/*" |

520-1

Instructions 520-1 to 520-P

Fig. 5

TYPED, PARAMETERIZED, AND
EXTENSIBLE ACCESS CONTROL
PERMISSIONS

RELATED APPLICATIONS

The present application is related to U.S. patent application Ser. No. 08/988,431, entitled "CONTROLLING ACCESS TO A RESOURCE", filed by Li Gong, on the equal day herewith the contents of which are incorporated herein by reference.

The present application is related to U.S. patent application Ser. No. 08/998,660, entitled "SECURE CLASS RESOLUTION, LOADING, AND DEFINITION", filed by Li Gong, on the equal day herewith the contents of which are incorporated herein by reference.

The present application is related to U.S. patent application Ser. No. 08/988,439, entitled "PROTECTION DOMAINS TO PROVIDE SECURITY IN A COMPUTER SYSTEM", filed by Li Gong, on the equal day herewith the contents of which are incorporated herein by reference.

FIELD OF THE INVENTION

The present invention relates to security mechanisms in a computer system.

BACKGROUND OF THE INVENTION

As the use of computer systems grows, organizations are becoming increasingly reliant upon them. A malfunction in the computer system can severely hamper the operation of such organizations. Thus organizations that use computer systems are vulnerable to users who may intentionally or unintentionally cause the computer system to malfunction.

One way to compromise the security of a computer system is to cause the computer system to execute software that performs harmful actions on the computer system. There are various types of security measures that may be used to prevent a computer system from executing harmful software. One example is to check all software executed by the computer system with a "virus" checker. However, virus checkers only search for very specific software instructions. Many methods of using software to tamper with a computer's resources would not be detected by a virus checker.

Another very common measure used to prevent the execution of software that tampers with a computer's resources is the "trusted developers approach". According to the trusted developers approach, system administrators limit the software that a computer system can access to only software developed by trusted software developers. Such trusted developers may include, for example, well know vendors or in-house developers.

Fundamental to the trusted developers approach is the idea that computer programs are created by developers, and that some developers can be trusted to not have produced software that compromises security. Also fundamental to the trusted developers approach is the notion that a computer system will only execute programs that are stored at locations that are under control of the system administrators.

Recently developed methods of running applications involve the automatic and immediate execution of software code loaded from remote sources over a network. When the remote sources include computer systems that are outside the control of system administrators, the trusted developers approach does not work.

One attempt to adapt the trusted developers approach to systems that can execute code from remote sources is referred to as the sand box method. The sand box method allows all code to be executed, but places restrictions on remote code. Specifically, the sand box method permits all trusted code full access to a computer system's resources and all remote code limited access to a computer system's resources. Trusted code is usually stored locally on the computer system under the direct control of the owners or administrators of the computer system, who are accountable for the security of the trusted code.

One drawback to the sandbox approach is that the approach is not very granular. The sandbox approach is not very granular because all remote code is restricted to the same limited set of resources. Very often, there is a need to permit remote code from one source access to one set of computer resources while permitting remote code from another source access to another set of computer resources. For example, there may be a need to limit access to one set of files associated with one bank to remote code loaded over a network from a source associated with that one bank, and limit access to another set of files associated with another bank to remote code loaded over a network from a source associated with the other bank.

Providing security measures that allow more granularity than the sand box method involves establishing a complex set of relationships between principals and permissions. A "principal" is an entity in the computer system to which permissions are granted. Examples of principals include processes, objects and threads. A "permission" is an authorization by the computer system that allows a principal to perform a particular action or function.

Establishing sets of permissions for principals that may be received from multiple sources on a vast network, such as the Internet, typically requires developing complex security software. After such security software is developed, it must often be changed in order to meet changing security requirements. Often, changing security requirements entail modifying permissions or creating new kinds of permissions. Typically, the security software of a computer system must be reprogrammed to incorporate these new kinds of permissions. Programming security software requires substantial effort and in-depth knowledge about a computer's security mechanisms and a computer's architecture.

Based on the foregoing, it is clearly desirable to develop a method which reduces the effort and in-depth knowledge required to modify permissions established for the sources of code being executed by a computer system. It is further desirable to develop a method which reduces the effort and in-depth knowledge required to create new permissions.

SUMMARY OF THE INVENTION

A method and system for providing security using typed and extensible control permissions is provided. According to one aspect of the invention, the establishment and maintenance of complex security rules are enforced in a way that takes advantage of the power and simplicity of the inheritance feature of object oriented programming.

Specifically, a "permission super class" is established from which subclasses may be created. Objects that belong to subclasses of the permission super class represent permissions, and are therefore referred to as permission objects.

The permission subclasses inherit the methods and attributes of the permission super class. According to one embodiment, one of the methods defined by the permission super class and inherited by the permission subclasses is a validation method. Each permission subclass inherits the validation method from the permission super class and provides an implementation of the validation method.

When the validation method is invoked for a particular permission object belonging to a permission subclass, the validation method indicates whether a given permission is encompassed by the permission represented by the particular permission object. For example, the validation method of a permission object PO1 may be invoked to determine whether the permission represented by another permission object PO2 is encompassed in the permission represented by PO1, where both PO1 and PO2 belong to classes that descend from said permission super class. In this we can determine whether a permission to perform a first action, represented by PO1, authorizes a request to perform a second action, which requires a second permission represented by PO2, by invoking the validation method of PO1 to determine whether the first permission represents an authorization to perform the requested second action.

According to another aspect of the invention, permissions represent actions on targets. Thus, a first permission object can specify a first action and a first target, and a second permission object can specify a second action and a second target. A determination is made of the whether the permission represented by the first permission object encompasses the permission represented by the second permission object based on whether the first action implies the second action and the first target implies the second target. In this we can determine, for example, whether a permission to perform a first action on a first target, represented by the first permission object, authorizes a request to perform a second action on second target, which requires a second permission represented by the second object, by determining whether first action implies the second action, and the first target implies the second target.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram showing an exemplary policy file;

DETAILED DESCRIPTION OF THE PREFERRED EMBODIMENT

A method and apparatus for providing typed permissions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
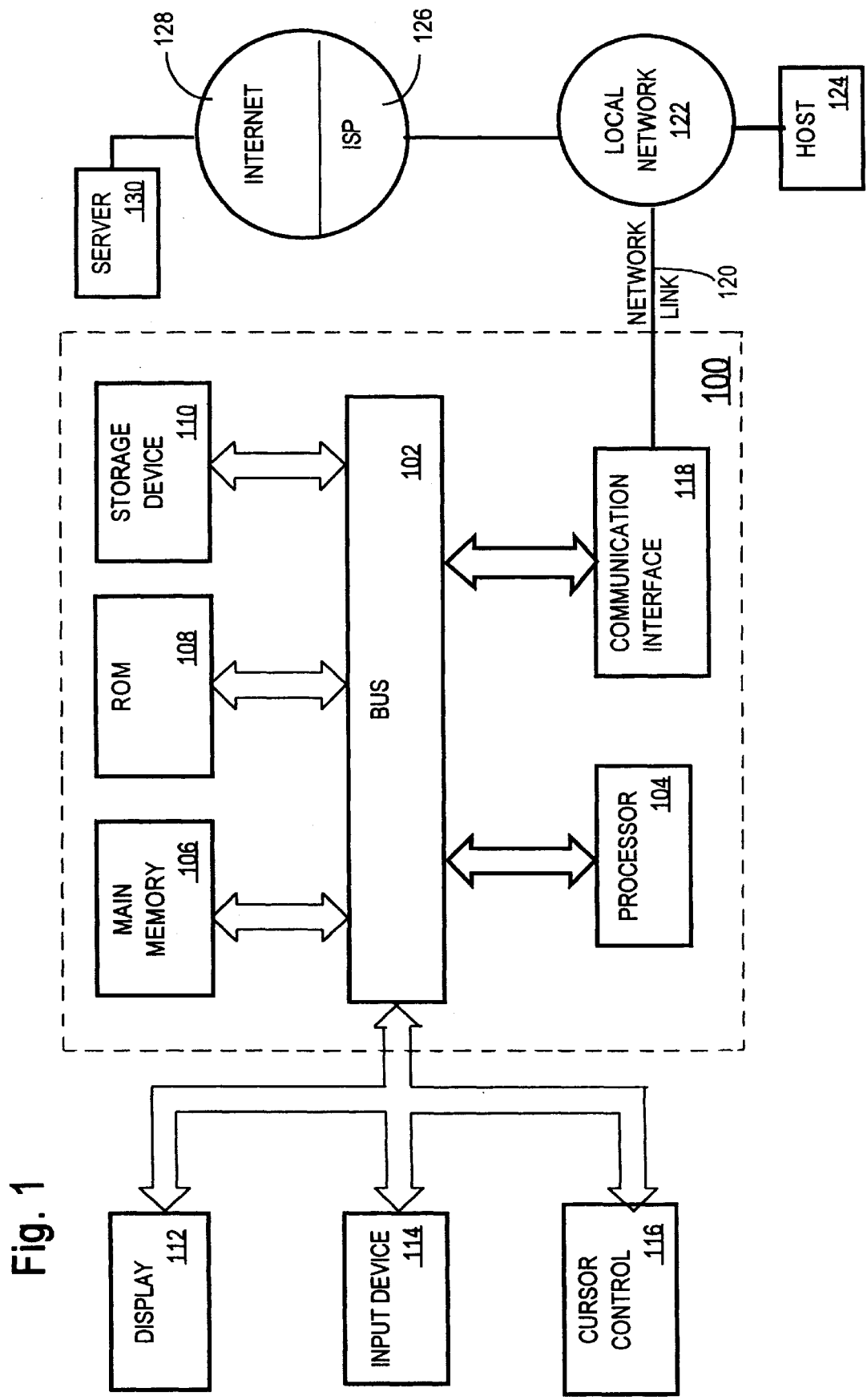
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for establishing typed permissions. According to one embodiment of the invention, establishing typed permissions is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for establishing typed permissions as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

As mentioned above, systems that allow execution of software from remote sources present difficult security problems. The systems that have been developed to address those problems are complex, often requiring the use of elaborate permission rules to deal with principals received from numerous sources. As the security needs of the systems change, the permission rules must be updated by someone who understands the complexities of the system.

According to one aspect of the invention, the complexities associated with elaborate permission rules and systems are reduced by making use of a powerful object-oriented concept understood by most programmers, known as "inheritance", to establish relationships between classes of permissions. The general concepts of object orientation, inheritance and classes are described in Appendix I.

As shall be described in greater detail hereafter, a "permission super class" is established from which subclasses may be created. Objects that belong to subclasses of the permission super class represent permissions, and are therefore referred to as permission objects. The permission subclasses inherit the methods and attributes of the permission super class, including a validation method. Each permission subclass provides an implementation of the validation method.

When the validation method is invoked for a particular permission object belonging to a permission subclass, the validation method indicates whether a given permission is encompassed by the permission represented by the particular permission object. For example, the validation method of a permission object PO1 may be invoked to determine whether the permission represented by another permission object PO2 is encompassed in the permission represented by PO1, where both PO1 and PO2 belong to classes that descend from said permission super class.

Because the establishment and management of permissions is implemented around the class and inheritance mechanism that is familiar to most programmers, permission management tends to be simpler and more intuitive. As the security needs of a system changes, the typed permission system provided herein allows easy modification to adapt to the changes, without requiring specialized knowledge of complex security-management techniques.

PERMISSIONS

As mentioned above, a permission is an authorization by the computer system that allows a principal to perform a particular action or function. According to one embodiment of the invention, permissions can be organized into categories that correlate to categories of actions that are performed on computer systems. Each category is characterized by one or more attributes shared by all permissions belonging to the category or subcategory. Attributes of each category include an action associated with the permission, and can include various other attributes that further qualify the action attribute, such as a target attribute. A target is any entity, such as a bank account, an adult TV channel, or a computer resource (e.g. files, memory, printers, database records), to which an action is directed.

For example, one common permission category is the file system permission category. A file system permission has an action attribute and a target attribute. The target is a particular file or set of files upon which an action can be performed. The action attribute is an action that can be performed on a file, such as "writing" to a file. The target attribute serves to further qualify the action by limiting the entities upon which the action can be performed. An example of a file system permission is an authorization to "write" (i.e. the action) to a particular file like "/anyfile" (i.e. the target). Note that in the examples provided herein, the file(s) and directory in which the file(s) is contained are represented in a form recognized by those skilled in the art.

Another example of a permission category is a bank account permission for a computer application used to manage bank accounts. A bank account permission can have an action attribute, an account attribute, and an amount attribute. An example of a bank account permission would be an authorization to "withdraw" from bank account "1233456" an amount of three dollars.

Note that permissions categories can further comprise subcategories that are useful for organizing permissions. For example, a subcategory of a bank account permissions can be permissions associated with a particular bank.

IMPLIED PERMISSIONS

One permission can imply another. When one permission implies another permission, that one permission is said to encompass the other permission. For example, a permission to write to a directory, such "c:/", can imply a permission to write to any file in the directory, such as "c:/thisfile". Furthermore, an attribute of a permission can imply an attribute of another permission. For example, in some implementations, the action attribute of a permission to "write" implies an action attribute of a permission to "read". An amount attribute of a permission to withdraw three hundred dollars implies another attribute of a permission to withdraw two hundred dollars.

Usually, a permission encompasses another permission when all the permission attributes of one permission imply all the corresponding permission attributes of another permission. For example, a permission to "write" to file "d:/somefile" implies a permission to "read" from file "d:/somefile" because a "write" implies a "read". However, a permission to "write" to file "d:/somefile" does not imply a permission to "read" from file "d:/otherfile" because "d:/somefile" does not imply "d:/otherfile".

REPRESENTING PERMISSIONS WITH CLASSES AND OBJECTS

Using the techniques described herein, classes are used to represent categories of and subcategories of permissions, and objects of those classes are used to represent the particular permissions in a category or subcategory of permissions. A permission represented by a class is herein referred to as a typed permission. Classes used to represent categories of permissions are herein referred to as permission classes. Objects which belong to a permission class are herein referred to as permission objects. Furthermore, the fields of a permission class are used to represent the attributes of the category or subcategory of permissions represented by the permission class.

For example, a FilePermission permission class can represent the category of file system permissions. The FilePermission class can have an action field which corresponds to the action attribute, and a target field which corresponds to the target attribute.

Each permission object contains fields with values corresponding to attributes of a particular permission represented by the permission object. For example, a given object belonging to the FilePermission class can have an action field with a value representing a "write" action, and a target field with a value representing the directory "d:/". In this example, the given object represents a permission to "write" to directory "d:/".

Note that each permission object is an instance of a permission class. Likewise, a permission object and the permission it represents are said to represent an instance of a permission category or subcategory.

THE PERMISSION SUPER CLASS

Because all permissions share some common attributes, it is useful and efficient to represent all categories of permissions with one class that is a super class of all permission classes. The super class for all permission classes is herein referred to as the permission super class. Each permission class is a subclass of the permission super class.

The permission super class contains fields which represent attributes common to all permissions. One such field is an action field, which represents the action attribute common to all permissions.

In addition to sharing attributes, the permission super class establishes a set of common methods that are useful for and inherited by all permission objects, such as a get_action method. The common action method returns a value representing the action field. An implementation for the get_action method may be provided in the permission super class. According to one embodiment, the implementation for the get_action method simply returns the value of the action field.

THE VALIDATION METHOD

In addition to implementing a set of common methods shared by permission subclasses, the permission super class also establishes the interface to methods that should be supported by every object but whose implementation depends on the particular permission class of the object.

An example of such method is a validation method that indicates whether a permission represented by one permission object encompasses another permission represented by another permission object. As noted earlier, a permission typically encompasses another permission when each attribute of the one permission implies the corresponding attribute of the other permission. Because attributes of one permission category may differ from attributes of another permission category, the permission classes which represent permission categories may contain different sets of fields, thus necessitating a different implementation of the validation method for some of the permission classes. Furthermore, the rules that govern whether a particular attribute implies another attribute may vary from one permission category to another. Hence, the implementation required for the validation methods which carry out the rules can vary.

For example, the FilePermission permission class has an action field and a target field. The target field could represent a file or a set of files (e.g. "d:/somedirectory/somefile"). A permission class representing a bank account, AccountPermission, can have an action field, an account field, and a maximum amount field. The two permission classes, FilePermission and AccountPermission have a different number attributes and different kinds of attributes.

The rules governing whether one attribute of one permission implies a corresponding attribute of another permission may differ from permission class to permission class as well. Specifically, the implementation of determining whether a permission for one set of files implies a permission for another set of files differs significantly from an implementation that determines whether a permission for one maximum amount implies another amount. It is worth noting that permissions of different permission classes usually cannot encompass each other.

Although the implementation of some methods supported by all permission objects can vary from one permission class to another, the permission super class may be used to ensure that the result type of a method and its parameters can remain constant across all permission classes. Defining the interface to method in the permission super class without providing the implementation for the method establishes an interface that can be relied upon by all objects and object implementers (i.e. programmers) when interacting with permission objects.

Those skilled in the art will recognize various techniques can be used to provide such an interface. One method would be to provide a super class with an abstract method that would be implemented by subclasses of the super class. Another method would be to provide a permission super class that defines a default implementation that subclasses can override. A default implementation can be, for example, to always return a value indicating that one permission is not encompassed by another permission. Another method uses Java Interfaces instead of abstract classes.

CREATING TYPED PERMISSIONS

Figure 2:
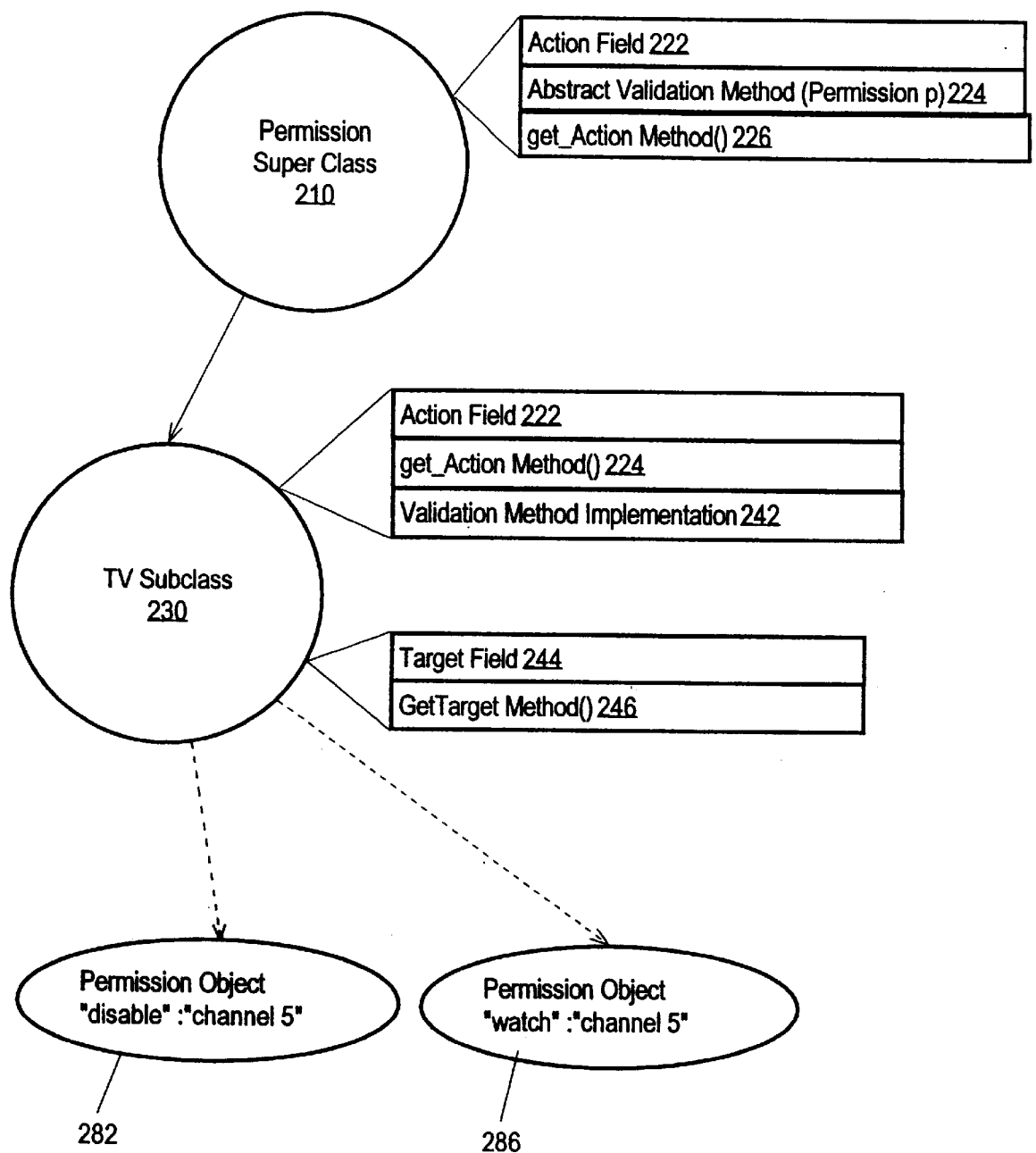
FIG. 2 is a block diagram showing attributes and methods associated with a permission super class and a subclass of the permission super class and permission objects belonging to the subclass of the permission super class in accordance with one embodiment of the present invention.

Techniques for creating and using typed permissions shall now be described with reference to the permission classes shown in FIG. 2. The classes shown in FIG. 2 are used to create objects that represent permissions to manage access to a television (TV). For purposes of illustration, assume that permissions associated with accessing a TV have an action attribute and a target attribute. The action attribute can either be to "watch", "enable", or "disenable" a channel. The target attribute represents a particular channel.

Several examples of permission objects representing several TV permissions are shown in FIG. 2. Permission Object 282 represents a permission to "disenable" "channel 5", and permission objects 286 represents a permission to "watch" "channel 5". Permission object 282 and permission object 286 are objects belonging to the subclass TV subclass 230. TV subclass 230 is a subclass of permission super class 210.

Figure 3:
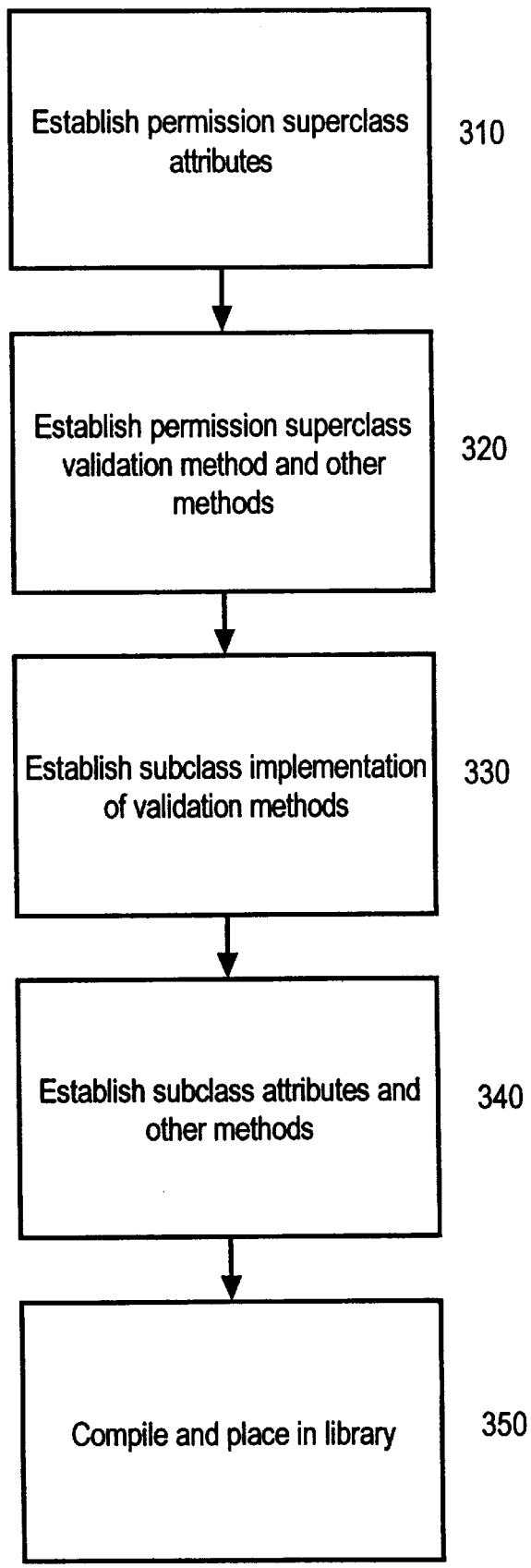
FIG. 3 is a flow chart showing the steps for establishing a permission super class and a subclass of the permission super class in accordance with one embodiment of the present invention.

Referring to FIG. 3, in step 310 the attributes of the permission super class are established. In this example, an action field 222 is established for permission super class 210. The action field 222 is a string data type. The action field 222 represents the permission attribute of any category of permission.

In step 320, a validation method and other methods for a permission object are established. In this example, an abstract validation method 224 is provided. The validation method accepts as its first parameter an object reference of the data type (i.e. class) Permission class. Thus an object reference referring to an object belonging to any permission class is an acceptable parameter. The data type of the value returned by the method is Boolean. The Boolean value returned by the validation method indicates whether the permission represented by the permission object referred to by the object reference is encompassed by the permission represented by the permission object whose validation method is invoked. For example, assume X and Y are permission objects. The method invocation X.Validation(Y) will return True if the permission represented by Y is encompassed in the permission represented by X, and False if the permission represented by Y is not encompassed in the permission represented by X.

According to one embodiment, no implementation of the abstract validation method 224 is provided in permission super class 210. The implementation is left to the subclasses of permission super class 210.

A get_action method is also provided in the permission super class 210. The get_action method returns a string value representing the value contained in the action field 222. An implementation is provided for the get_action method. The implementation merely returns the value of the action field as the return value of the get_action method.

Those skilled in the art will recognize that other methods and attributes can be provided. Only some of these methods and attributes have been illustrated in order to avoid unnecessarily obscuring the techniques described herein.

An example code implementation of a permission super class 210 is illustrated below. Although the code example may resemble the JAVA programming language by Sun Microsystems Inc., the example is merely for illustrative purposes and is not meant to be representative of an actual code implementation.

```
abstract class Permission {
    protected String action;
    abstract Boolean validate(Permission p);
    .
    .
    .
}
```

ESTABLISHING PERMISSION SUBCLASSES

In step 330, an implementation of the abstract validation method 224 is provided in the form of a validation implementation 242 of a subclass of Permission super class 210. In this example, a TV subclass 230 is defined as a subclass of Permission super class 210. The implementation 242 of abstract validation method 224 includes code which, when executed, initially determines whether the object reference parameter refers to a permission object of same class as that of the permission object whose validation method is being invoked.

When the classes of permission objects differ, one permission represented by a permission object does NOT encompass the permission represented by the other permission object because a permission of one category does not encompass a permission of another category. For example, a TV permission does not encompass a file system permission.

Next, the code in the implementation 242 ensures that each attribute of the permission represented by the object reference is implied by each attribute of the permission represented by the object whose validation method is invoked. For example, if the action field and the target field of the permission object referred to by the object reference are identical to the action field and target field of the permission object whose validation method is invoked, then the validation method returns a true Boolean value.

In step 340, attributes and other methods of the TV subclass 230 are established. The other methods may include both new methods, and new implementations that override the implementations of inherited methods. In this example, a target field representing the target attribute of a TV permission is defined. A get_target method 246 is also provided. The get_target method simply returns a string value representing the channel attribute of the permission represented by the TV permission object.

An example code implementation of the TV subclass 230 is illustrated below. Although the code example may resemble the JAVA programming language by Sun Microsystems Inc., the example is merely for illustrative purposes and is not meant to be representative of an actual code implementation.

```
class TV extends Permission {
    protected String target;

public string get_target() {
        return target;
    }

TV(String a, String t){
        action = a;
        target = t;
    } public Boolean validate(Permission p) {
        if (p instance of TV == false)
            return false;
        TV reqPerm = (TV)p;
        if (reqPenn.get_action() != action)
            return false;
        if (reqPerm.get_target() != target)
            return false;
        return true
    }
    .
    .
    .
}
```

In step 350, the permission super class 210 and subclasses of the permission super class 210 are compiled and placed in a software library. Those skilled in the art are familiar with software tools and techniques used to compile the classes described above and to place them in software libraries. An example of such a tool is the Java Development Kit by Sun Microsystems Inc.

Those skilled in the art will recognize that, in addition to the ones illustrated above, other attributes and methods are possible in permission subclasses. Only some these attributes and methods have been illustrated in order to avoid unnecessarily obscuring the techniques described herein.

Furthermore, techniques described above are not limited to permission classes whose parent class is the permission super class 210. The techniques are applicable to subclasses of other permission classes which themselves are descendants of the permission super class. For example, it may be useful to provide a TV permission class, and then a subclass of the TV permission class that corresponds to a particular cable company.

PERMISSIONCOLLECTION OBJECTS

In an embodiment of the invention, a PermissionCollection super class is provided to allow security administrators to easily manage sets of permissions. A PermissionCollection class is used to create objects that each contain a set of zero or more permission objects. An object that is a subclass of the PermissionCollection super class is herein referred to as a PermissionCollection object. A PermissionCollection object manages a set of permission objects contained by the PermissionCollection object. A homogenous PermissionCollection object may only contain permission objects belonging to the same class, a heterogeneous PermissionCollection object may contain permission objects belonging to different classes.

The PermissionCollection super class defines several methods. One method returns an enumeration of the permission objects contained in the PermissionCollection object.

Another method, add_permission, adds a permission object to the set of permission objects contained in the PermissionCollection object. The add_permission method has a parameter of the type Permission. In the case of a homogenous PermissionClass object, for example, the method to add a permission object does not add a permission object if it is not of the same type (i.e. class) as any other permission object already contained in the PermissionCollection object. The method returns a Boolean flag indicating whether or not a permission object was added.

A group validation method is another method defined by the PermissionCollection super class. The method accepts one parameter of the data type Permission. The method indicates whether or not any of the permissions represented by the permission objects contained in a PermissionCollection object encompass the permission represented by the permission object specified by the parameter. The method processes each permission object by invoking each permission objects validation method until either (1) the validation methods of all permission objects in the set have returned False or (2) a validation method for a permission object in the set returns True.

A PermissionCollection object used to manage a set of permission objects can be created directly for the PermissionCollection super class, or from a subclass of the PermissionCollection class. A subclass of the PermissionCollection super class can contain methods that provide functionality specific to a particular permission class.

For example, a PermissionCollection object for FilePermissions can provide an IsTargetImplied method. The IsTargetImplied method indicates whether or not a particular target is implied by another target. For example, the method could syntactically determine whether "/sys/sysfile" is implied by "/sys/*".

SECURITY USING "FINAL" DESIGNATION

Many programming languages provide the keyword "final" to designate that something cannot be overridden. For example, if a class X is defined as final, then the compiler will generate an error if subsequent code attempts to define a subclass of class X. Alternatively, a class that is not final may have one or more methods that are declared to be final. For example, class Y may not be final, but class Y may define five methods, three of which are declared to be final. Under these circumstances, the compiler will allow subsequent code to define a subclass of class Y, but the subclass will inherit the three methods as is. The subclass will not be able to override the three inherited methods by defining alternative implementations for the methods.

According to one embodiment of the invention, support for the "final" keyword is combined with permission classes to implement strong but flexible security mechanisms. For example, assume that a first developer defines a FilePermission subclass of the Permission super class. Assume further that the Validation method for the FilePermission class returns True when the invoked permission is "write c:\*" and the input permission is "write c:\sys\config.txt". The first developer may want to distribute the FilePermission class in a runtime library for use by other developers.

If a user of the library is allowed to create a subclass of the FilePermission class and override the validation method, the security policy programmed into the FilePermission logic may be compromised. For example, security would be compromised if the validate method of the FilePermission class is overridden with logic that returns True when the invoked permission is "write c:\*" and the input permission is "write d:\*".

For the first developer, it may be critical for the applications developed by the users of the runtime library to reflect the same degree of security as is programmed into the FilePermission logic. To prevent security loopholes, the first developer may declare the FilePermission class to be final. As a result, any user of the library would be unable to use any security policies with respect to file access other than the security policies embodied in the original FilePermission class.

While declaring the FilePermission class to be final will prevent security breaches, it limits the flexibility of the library. For example, users of the library should be allowed to implement security policies with respect to file access that are more restrictive than the FilePermission class policies. Thus, a user of the library may decide to implement a system that requires exact directory matches. In such a system "write c:\*" would encompass "write c:\hello.txt" but would not encompass "write c:\sys\joe.txt".

To allow library users to enforce more restrictive security policies, the FilePermission class may be non-final, while all methods of the class but one are declared as final. The non-final method, which may be called the AdditionalCheck method, may be overridden by the library user. The Validation Method, which is final, may call the AdditionalCheck method as a final step to determine whether a particular permission is encompassed by the invoked permission object. The Boolean value generated by the Validation Method logic are combined in a logical AND operation with the Boolean value generated by the AdditionalCheck method to produce the Boolean value that is ultimately returned by the Validation Method.

Because the value returned by the Validation Method is always false if the validation method logic is false, the security policy employed by the application developed by a library user is at least as restrictive as those embodied in the original FilePermission class logic. However, because the library user is allowed to override the AdditionalCheck method, the library user has the flexibility to implement security rules that are more restrictive than the original FilePermission class logic.

EXEMPLARY SECURITY MECHANISM

Figure 4:
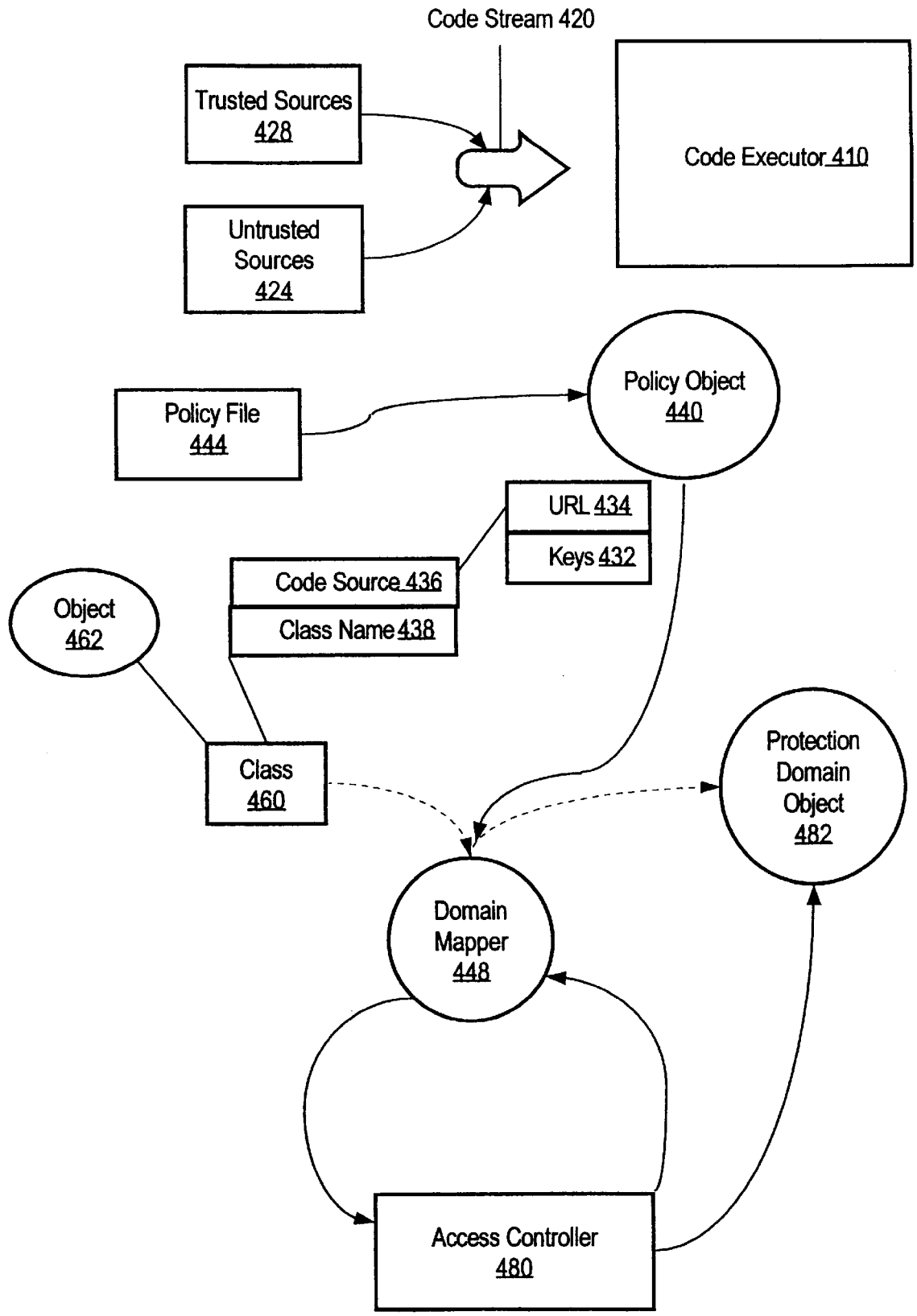
FIG. 4 is a block diagram outlining a security mechanism using permission objects in accordance with one embodiment of the present invention.

An exemplary security mechanism illustrating one use of typed permissions is shown in FIG. 4. Referring to FIG. 4, the exemplary security mechanism includes a policy file 444, a policy object 440, a domain mapper object 448, an access controller 480, and one or more protection domains 482. The security mechanism is implemented using a code executor 410.

Code executor 410 executes code which code executor 410 receives from code stream 420. One example of a code executor is a Java virtual machine. A Java virtual machine interprets code called byte code. Byte code is code generated by a Java compiler from source files containing text. The Java virtual machine is described in detail in Tim Lindholm & Frank Yellin, *The Java Virtual Machine Specification* (1996).

For the purposes of explanation, it shall be assumed that code from code stream 420 is object oriented software. Consequently, the code is in the form of methods associated with objects that belong to classes. One or more class definitions for a class are contained in code from code stream 420. The fields and methods of the objects belonging to a class are defined by a class definition. These class definitions are used by code executor 410 to create objects which are instances of the classes defined by the class definitions.

These class definitions are generated from source code written by a programmer. For example, a programmer using a Java Development Kit enters source code that conforms to the Java programming language into a source file. The source code embodies class definitions and other instructions which are used to generate byte code which controls the execution of a code executor (i.e. a Java virtual machine). Techniques for defining classes and generating code executed by a code executor, such as a Java virtual machine, are well known to those skilled in the art.

Each class defined by a class definition from code stream 420 is associated with a class name 438 and a code source 436. Code executor 410 maintains an association between a class and its class name and code source. The code source represents a source of code from which is code received. A "source of code" is an entity from which computer instructions are received. Examples of sources of code include a file or persistent object stored on a data server connected over a network, a FLASH_EPROM reader that reads instructions stored on a FLASH_EPROM, or a set of system libraries.

The code source may be a composite record containing a uniform resource locator ("URL") 434 and set of public cryptographic keys 432. A URL identifies a particular source. The URL is a string used to uniquely identify any server connected to the world wide web. A URL may also be used to designate sources local to computer system 100. Typically, the URL includes the designation of the file and directory of the file that is the source of the code stream that a server is providing.

A public cryptographic key, herein referred to as a key, is used to validate the digital signature which may be included in a file used to transport related code and data. Public cryptographic keys and digital signatures are described in Schneier, *Applied Cryptography*, (1996). The keys may be contained in the file, may be contained in a database associating keys with sources (e.g. URLs), or be accessible using other possible alternative techniques.

A class may be associated with the digital signature associated with the file used to transport code defining the class, or the class definition of the class may be specifically associated with a digital signature. A class that is associated with a valid digital signature is referred to as being signed. Valid digital signatures are digital signatures that can be verified by known keys stored in a database. If a class is associated with a digital signature which can not be verified, or the class is not associated with any digital signature, the class is referred to as being unsigned. Unsigned classes may be associated with a default key. A key may be associated with a name, which may be used to look up the key in the database.

While one code source format has been described as including data indicating a cryptographic key and URL, alternate formats are possible. Other information indicating the source of the code, or combinations thereof, may be used to represent code sources. Therefore, it is understood that the present invention, is not limited to any particular format for a code source.

TRUSTED AND UNTRUSTED SOURCES

The source of code stream 420 may be from zero or more untrusted sources 424 or zero or more trusted sources 428. Untrusted sources 424 and trusted sources 428 may be file servers, including file servers that are part of the World Wide Web network of servers connected to the Internet. An untrusted source is typically not under the direct control of the operators of computer system 100. Code from untrusted sources is herein referred to as untrusted code.

Because untrusted code is considered to pose a high security risk, the set of computer resources that untrusted code may access is usually restricted to those which do not pose security threats. Code from a trusted source is code usually developed by trusted developers. Trusted code is considered to be reliable and pose much less security risk than remote code.

Software code which is loaded over the network from a remote source and immediately executed is herein referred to as remote code. Typically, a remote source is a computer system of another separate organization or individual. The remote source is often connected to the Internet.

Normally untrusted code is remote code. However, code from sources local to computer system 100 may pose a high security risk. Code from such local sources may be deemed to be untrusted code from an untrusted source. Likewise, code from a particular remote source may be considered to be reliable and to pose relatively little risk, and thus may be deemed to be trusted code from a trusted resource.

According to one embodiment of the invention, typed permissions are used in conjunction with protection domains to implement security policies that allow trusted code to access more resources than untrusted code. A security policy thus established determines what actions code executor 410 will allow the code within code stream 420 to perform. The use of typed permissions and protection domains allows policies that go beyond a simple trusted/untrusted dichotomy by allowing relatively complex permission groupings and relationships.

Protection domains and policies that may be used in conjunction with typed permissions shall now be described in greater detail with continued reference to FIG. 4.

PROTECTION DOMAINS AND POLICIES

Protection domains are used to enforce security within computer systems. A protection domain is a set of permissions granted to one or more principals. As described above, permissions are represented by permission objects. Libraries, usually located in trusted sources, contain class definitions for the permission super class 210 and permission classes. Typically these libraries are accessible by code being executed by code executor 410.

The correlation between permissions and principals constitutes the policy of the system. FIG. 4 illustrates an exemplary policy implemented through use of a policy file 444. A protection domain in this exemplary policy is defined as the set of permissions granted to the objects associated with a particular code source. The policy of the system is represented by one or more files containing instructions. The instructions map code sources to permission objects which represent the permissions authorized for the protections domain corresponding to the code source. Each instruction establishes a mapping between a particular code source and a particular permission object. An instruction represents one authorized permission for the objects belonging to the classes associated with the code source in the instruction.

The format of a typical instruction in the exemplary policy file 444 is:

<"permission"><URL><key name><permission class name><action><target>

The <URL> and the key corresponding to the <key name> represent a code source. The key name is associated with a key. The key and corresponding key name are stored together in a database. The key name can be used to find the key in the database. The <permission class name> represents data identifying a permission class. The <action> and <target> represents data used to initialize (i.e. using an permission object constructor) the action and target fields in a permission object belonging to the identified permission class. Instruction 520-1 in FIG. 5, for example, is an authorization of a permission to write to any file in "/tmp/*" by any object of the class associated with code source "file://somesource"-"somekey" (i.e. URL-key name).

Referring to FIG. 4, in order to efficiently and conveniently implement the policy and establish protection domains, policy object 440, domain mapper object 448, and one or more protection domain objects 482 are provided. Policy object 440 provides a mapping of code source to permission objects based on the policy file. Policy object 440 is initialized when code executor 410 is initialized. The policy object 440 parses the policy file 444. For each instruction, a permission object of the permission class designated in the instruction is created using the values of the action and target attributes that are designated in the instruction. Finally, the permission object is mapped to the code source designated in the instruction.

While one method for representing the security policy of computer system has been described, other methods are possible. For example, a policy data base may contain fields that represent the code source, permission class, action and target. Therefore, it is understood that the techniques described herein are not limited to any specific method of storing a representation of security policy of a computer system.

Note that even though the instruction illustrated above contains data used to initialize two fields, a permission object may in fact have more or less than two fields to initialize. For example, a bank account permission may have an action, account, and maximum amount attribute. When a bank account permission object is initialized, the values in instruction corresponding to action, account, and maximum amount attributes would be used to initialize the permission object.

The domain mapper object 448 contains a mapping between classes and protection domains objects. Protection domain objects 482 contain a set of permissions. Protection domain objects are associated with the permission objects they contain, and with the classes to which a protection domain object is mapped to by domain mapper object 448.

Protection domain objects 482 are created when new classes are received by code executor 410. When a new class is received, domain mapper 448 determines whether a protection domain is already associated with the code source. The domain mapper maintains data indicating which protection domains have been created and the code sources associated with the protection domains. If a protection domain is already associated with the code source, the domain mapper adds a mapping of the new class and protection domain to a mapping of classes and protection domains maintained by the domain mapper 448.

If a protection domain object is not associated with the code source of the new class, a new protection domain object is created and populated with permissions. The protection domain is populated with those permission that are mapped to the code source of the new class based on the mapping of code sources to permissions in the policy object. Finally, the domain mapper adds a mapping of the new class and protection domain to the mapping of classes and protection domains as previously described.

In other embodiments of the invention, instead of storing the mapping of classes to protection domains in a domain mapper object, the mapping is stored as static fields in the protection domain class. The protection domain class is the class to which protection domain objects belong. There is only one instance of a static field for a class no matter how many objects belong to the class. The data indicating which protection domains have been created and the code sources associated with the protection domains is stored in static fields of the protection domain class. Alternatively, a mapping between a class and protection domains associated with the class is stored as static fields in the class.

Static methods are used to access and update the static data mentioned above. Static methods are invoked on behalf of the entire class, and may be invoked without referencing a specific object.

EXEMPLARY ACCESS CONTROL

Figure 6:
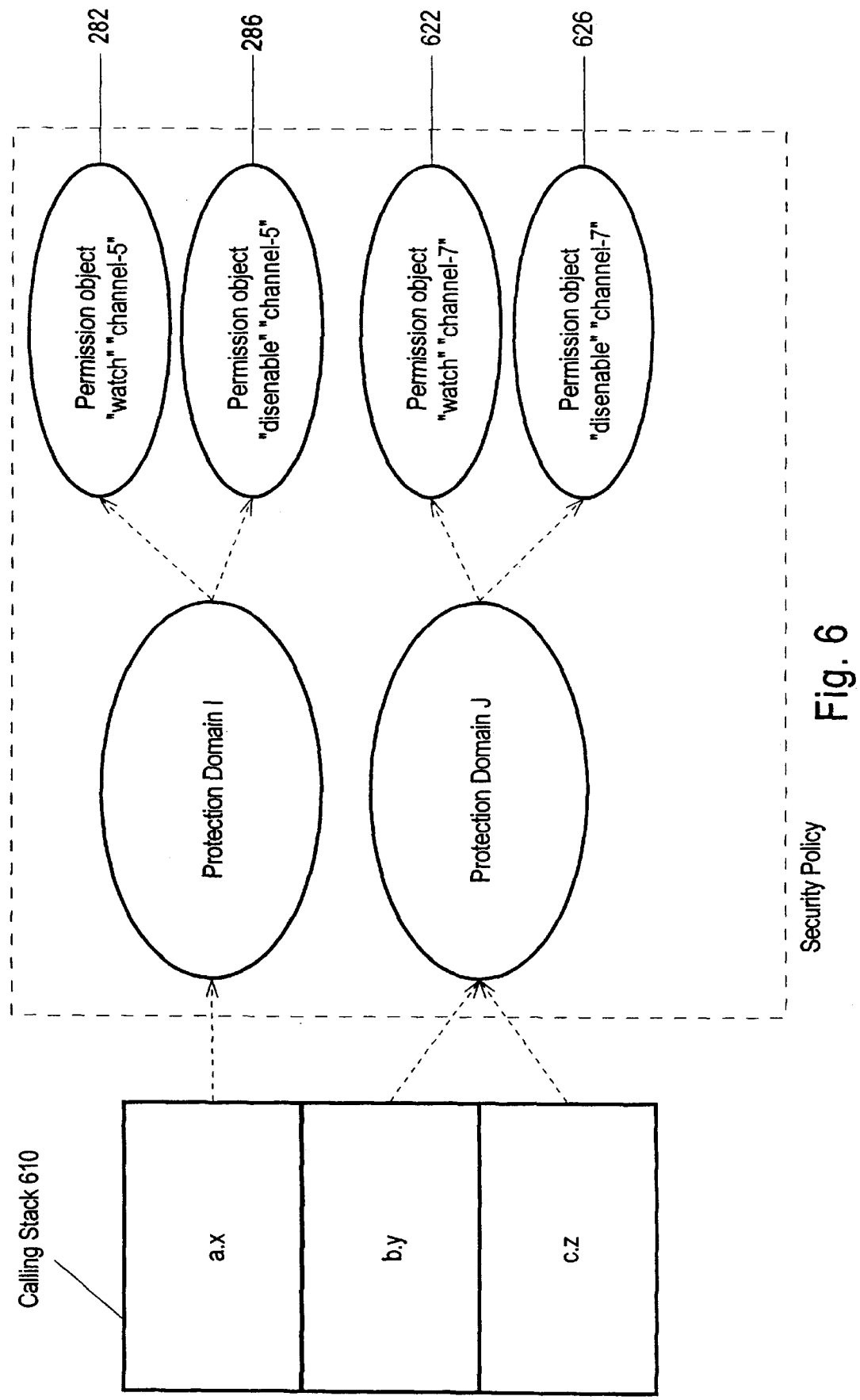
FIG. 6 is a block diagram showing a call stack associated with a thread and the protection domains containing permission objects associated with the objects represented by the call stack in accordance with one embodiment of the present invention.
Figure 7:
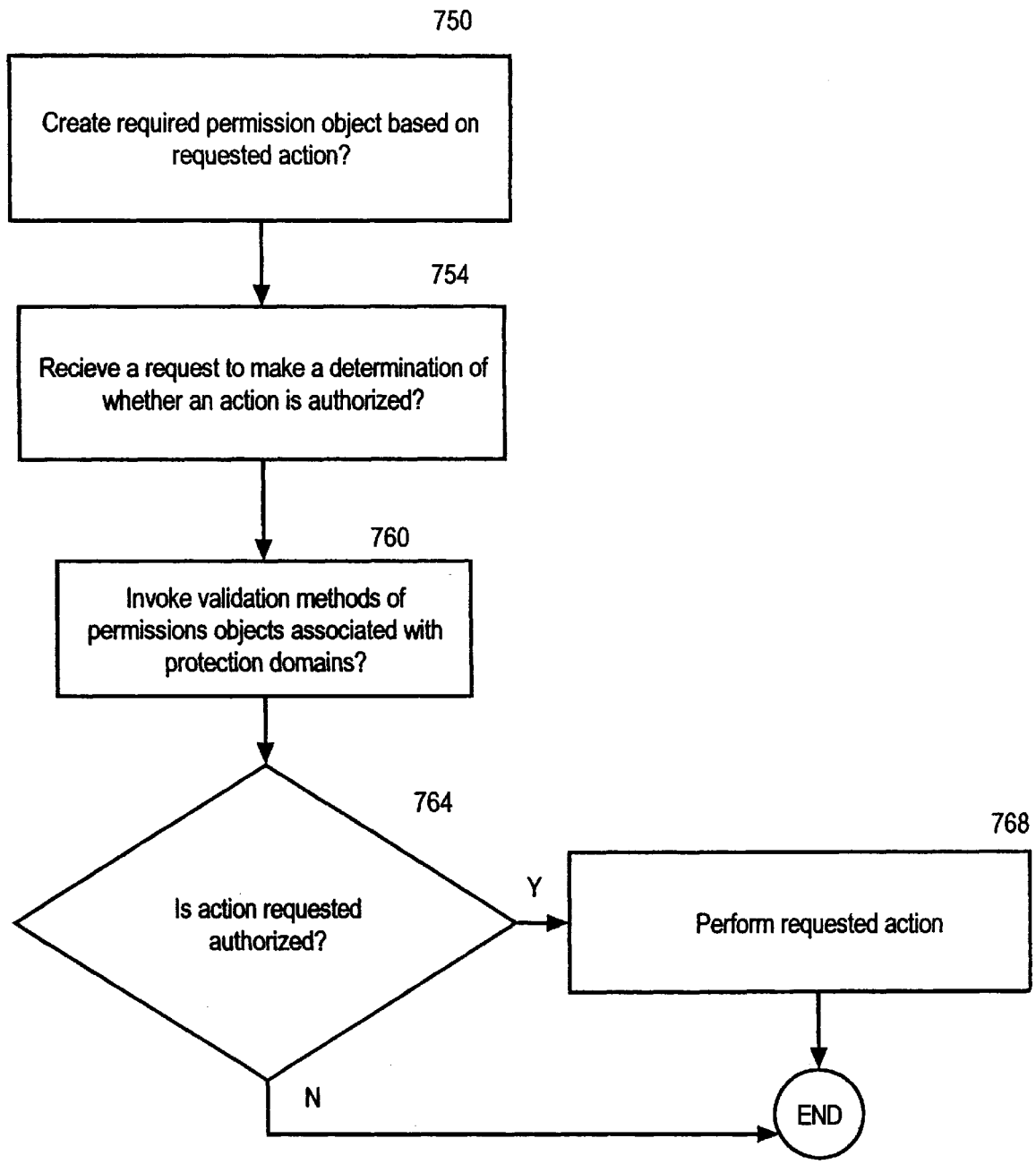
FIG. 7 is a flow chart showing steps followed by a security mechanism to determine whether a particular action is authorized in accordance with one embodiment of the present invention.

An exemplary method using access controller 480 according to steps shown in FIG. 7 illustrates a use of permission objects. The calling stack, protection domains, and permission objects shown in FIG. 6 are used as an example illustrating the performance of the steps shown in FIG. 7.

A code executor, such as a Java virtual machine, maintains for each thread or process a call stack of the object methods invoked by the thread or process. The call stack reflects the calling hierarchy between the methods that have been invoked but not yet completed by the thread or process. The call stack includes information identifying the objects with methods on the call stack. For example, assume that a thread executes a.x (where "a" is an object and "x" is a method associated with object "a"). Assume that a.x invokes b.y which invokes c.z. While c.z is executing, the call stack will contain data identifying a.x, b.y, and c.z. At this point, call stack 610, in FIG. 6, represents the calling hierarchy of the methods invoked by the thread but have not yet been completed by the thread. When the thread finishes execution of c.z, the data identifying c.z will be removed from call stack 610.

Note that each object represented by the call stack is associated with a protection domain. Object a is associated with protection domain I and object b and object c are associated with protection domain J. Each protection domain object shown in FIG. 6 is associated with permission objects. The association between the objects, protection domain objects, and the permission objects is based on the a domain mapper object 448, policy object 440, policy file 444, and constitutes the security policy with respect to the objects shown in FIG. 6.

Assume that a thread invokes a.x, b.y, and c.z in the manner described so that call stack 610 is as it appears in FIG. 6. Referring to FIG. 7, assume that b.y requests an action, the action being to "disenable" "channel-5". Typically, a request is in the form of an attempt to invoke a particular method that performs a particular operation. In this example, the particular request is made by object b. In other words, a method associated with object b invoked a method that may perform the particular action.

Typically, access to a resource by code being executed by a code executor can only be made by invoking a resource manager. A resource manager is an object assigned the responsibility of managing access to its respective resource. In this example, object a is the resource manager. It is the resource manager, object a, that receives the request from object b.

In step 754, the resource manager creates a permission object based on the permission required to perform the requested action. In this example, the permission required to perform this action is to "disenable" "channel-5". A permission object belonging to TV subclass 230 is created based on the permission required, using "disenable" and "channel-5" as values for the action and target fields respectively. The permission required to perform a requested action is herein referred to as a required permission. The permission object created on the basis of the permission required is herein referred to as the required permission object. Control passes to step 760.

DETERMINING WHETHER AN ACTION IS AUTHORIZED

In step 754, a request is received for a determination of whether the action is authorized. The determination is based on the permission required to perform the action. In this example, the resource manager invokes an access controller to determine whether the permission required is authorized for the entity requesting access. The access controller receives the request and a required permission object which was transmitted by the resource manager.

In step 754, the validation methods of one or more permission objects is invoked in order to determine whether an action is authorized based on the permission required. An action is authorized if every protection domain object associated with an object requesting a determination of whether an action is authorized contains a permission represented by a permission object that encompasses the required permission for the action.

The protection domains associated with an object requesting the determination are the protection domain objects associated with each object represented by the calling hierarchy when the request was made. Any protection domain object associated with an object requesting a determination of whether an action is authorized is herein referred to as associated protection domain object. Finding the protection domain objects associated with a given object begins by determining the class of a given object. A code executor, such as a Java virtual machine, provides that each object incorporate a method which returns the class of an object. Next, the method of the class/domain mapper that returns the protection domain object associated with a class is invoked.

For each of the associated protection domain objects, the validation methods of each permission object contained in the protection domain object are invoked passing in the permission required object as a parameter. The validation methods of each permission object contained in the associated protection domain are invoked until a permission object indicates that the permission it represents encompasses the required permission. If none of the permission objects in a protection domain indicates that the permission the permission object encompasses the required permission, then the remainder of the associated protection domain objects are ignored.

In this example, the access controller first determines the protection domain associated with the first object represented on call stack 610, which is object a. The protection domain associated with object a is protection domain I. The validation method of the first permission object, permission object 282 (in FIG. 6), is invoked, passing in the required permission object as a parameter. As mentioned earlier, the required permission represented by the required permission object is a permission to "disenable" "channel-5". When the validation method of the first permission object is invoked the validation method indicates that the required permission is not encompassed. Next, the validation method of permission object 286 (in FIG. 6) is invoked. The invocation of the validation method of permission object 286 indicates that the required permission is encompassed.

The access controller then invokes the validation methods of the permission objects in the next protection domain object, protection domain object J, in the manner described. Each invocation of the validation methods of permission object 622 and permission object 626 indicates that the required permission is not encompassed.

At step 764, a determination is made of whether the action requested was authorized. If every associated protection domain contains a permission object that represents a permission encompassing the required permission, then the requested action is authorized. When the requested action is authorized, control passes to step 768, where the action is performed before execution of the steps ceases. In this example, because not every protection domain object contained a permission encompassing the required permission, performance of the steps ends. The requested action is not executed.

Typed permissions facilitate the establishment of new permissions. When a new category of permissions is desired, a new subclass is created. The particular rules or policy that govern whether the permissions granted a principal are encompassed by permission in the new category are implemented in the validation method of the new subclass representing permissions in the new subclass.

Providing an abstract method for the determining whether a particular permission is encompassed by another establishes an standard interface for determining whether a particular permission represented by an permission object is encompassed by the permission represented by another permission object. The interface can be used and relied upon by any security mechanism. The security mechanisms that use the standard interface automatically effectuate rules or particular policy of a new permission category represented by the new subclass.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX I

OBJECT ORIENTATION AND INHERITANCE

In object oriented programming, the world is modeled in terms of objects. An object is a record combined with the procedures and functions that manipulate it. All objects of a class have the same fields, and are manipulated by the same procedures and functions ("methods"). An object is said to be an "instance" of the class to which it belongs.

Sometimes an application requires the use of classes that are similar, but not identical. For example, the classes used to model both dolphins and dogs might include the fields for the nose, mouth, length and age. However, the dog class may require a hair color field, while the dolphin class requires a fin size field.

To facilitate programming in situations in which an application requires multiple similar fields, object oriented programming supports "inheritance". Without inheritance, a programmer would have to write one set of code for the dog class, and a second set of code for the dolphin class. The code implementing the fields and methods common to object classes would appear redundantly in both classes. Duplicating code in this manner is very inefficient, especially when the number of common fields and methods is much greater than the number of unique fields. Further, code duplication between classes complicates the process of revising the code, since changes to a common fields will have to be duplicated at multiple places in the code in order to maintain consistency between all classes that have the field.

Inheritance allows a hierarchy to be established between classes. The fields and methods of a class automatically become fields and methods of the classes that are based upon the given class in the hierarchy. For example, an "animal" class may be defined to have nose, mouth, length and age fields, with associated methods. To add these fields and methods to the dolphin and dog classes, a programmer can specify that the dolphin and dog classes "inherit" the animal class. A class which inherits its fields and methods from another class is said to be a subclass of the other class. The other class, the class from which the subclass inherited its fields and methods, is said to be a parent class. In this example, the dolphin and dog classes are "subclasses" of the animal class, and the animal class is a parent class of the dog and dolphin classes.

The code for the inherited fields and methods is located in the parent class and is not duplicated in any subclasses. The subclasses only contain the code for fields and methods that supplement or override the fields and methods of the parent class. Consequently, all revisions to a parent class automatically apply to all subclasses. For example, if the field "age" is defined as an integer in the animal class and is not overridden in the dog and dolphin classes, then the dog and dolphin classes will include an integer to store an age value. If the animal class is revised so that "age" is defined as a real number, then the dog and dolphin classes will automatically include a real number to store an age value.

Note a third or greater level in a hierarchy of a classes can be established. A given class can inherit fields and methods of a class that is itself of a subclass of another class. A class above a particular class in a hierarchy is said be a super class to that particular class. Thus a parent class is a super class to its subclasses, and a super class to any class inheriting from a subclass of that parent class.

METHODS AND ABSTRACT CLASSES

The methods of classes accept zero or more parameters. A class constructor, which is similar to a method, is used to initialize the fields of an object when objects belonging to that class are created.

The code containing the instructions to perform the operations associated with a method is said to be an implementation of the method. A method may be defined for a class without an implementation. A method with no implementation is said to be an abstract method; a class which contains an abstract method is said to be an abstract class.

Abstract classes are useful for establishing a common interface for the subclasses of abstract classes. The interface for an abstract method establishes the name of the method, the data type returned by a method and the data type of the method's parameters. The subclasses of an abstract class is responsible for providing the implementation of the abstract method.

For example, assume that it is desired that all objects provide an interface which includes a method that indicates the number of legs an animal has. An abstract class, named animal, with an abstract method called get_legs that returns an integer representing the number of legs can be defined. Every subclass of the animal class would be responsible for providing code which implements the get_legs method for the particular type of animal represented by the subclass. For example, a cow subclass would provide a specific implementation for get_legs that returned the integer four when the get_legs method of a cow object was invoked.

The fields and methods of a class are defined by a class definition in software. Class definitions contained in software are typically created from source code usually received from a programmer. The source code is compiled into the code which can be executed by computer system 100. For example, a programmer using a Java Development Kit enters source code in the Java programming language into a source file. The source code embodies class definitions and other instructions which are used to generate byte code which control the execution of a Java code executor, a virtual machine. The JAVA™ virtual machine is described in detail in "The JAVA™ Virtual Machine Specification," by Tim Lindholm and Frank Yellin (Sun Microsystems, Inc.: Addison-Wesley Publishing Co.). The JAVA™ programming language is described in detail in "The JAVA™ Language Specification," by James Gosling, Bill Joy and Guy Steele (Sun Microsystems, Inc.: Addison-Wesley Publishing Co.), and related texts in the JAVA™ Series published by Addison-Wesley.

What is claimed is:

1. A method for providing security, the method comprising the steps of:
   establishing a permission class;
   wherein each permission object that is a member of said permission class represents at least one permission to perform an action;
   wherein said permission class includes a validation method; and
   wherein said validation method, when invoked for a particular permission object belonging to said permission class, indicates whether a specified permission is encompassed by a permission represented by the particular permission object.

2. The method of claim 1, wherein:
   the step of establishing a permission class includes establishing a permission subclass that is a descendant of a permission super class; and
   the permission super class defines an interface of said validation method.

3. The method of claim 2, further including the steps of:
   obtaining a first permission object, wherein said first permission object belongs to said permission subclass;
   obtaining a second object, wherein said second object belongs to a descendent class of the permission super class; and
   determining whether a first permission represented by said first permission object encompasses a second permission represented by said second object by invoking a validation method associated with said first permission object.

4. The method of claim 3, wherein the step of obtaining a second object includes obtaining a second object that belongs to said permission subclass.

5. The method of claim 3, wherein the step of obtaining a second object includes obtaining a second object that belongs to a class that is different from said permission subclass.

6. The method of claim 5, wherein:
   the method further includes the step of receiving a request to perform a particular action; and
   the step of obtaining said second object includes the step of obtaining said second object based on said request to perform said particular action.

7. The method of claim 6, wherein the step of determining whether said first permission represented by said first permission object encompasses said second permission represented by said second object includes sending to the validation method of said first object data that identifies the second object.

8. The method of claim 4, further including the steps of:
   obtaining a first permission object, wherein said first permission object belongs to said permission subclass, wherein said first permission object specifies a first action and a first target;
   obtaining a second object, wherein said second object belongs to a descendent class of the permission super class, wherein said second object specifies a second action and a second target; and
   determining whether a first permission represented by said first permission object encompasses a second permission represented by said second object by determining whether said first action encompasses said second action and determining whether said first target encompasses said second target.

9. The method of claim 3, further including the steps of obtaining a permission collection object associated with a plurality of permission objects, wherein said permission collection object includes a group validation method which, when invoked, indicates whether a specified permission is encompassed by at least one permission represented by said plurality of permission objects.

10. The method of claim 3, wherein:
    the step of establishing a permission class includes establishing a permission subclass that is a descendant of a permission super class; and
    the permission super class defines an interface of said validation method without providing an implementation for said validation method.

11. A computer-readable medium carrying one or more sequences of one or more instructions for providing security, the one or more sequences of the one or more instructions including instructions which, when executed by one or more processors, cause the one or more processors to perform the steps of:
    establishing a permission class;
    wherein each permission object that is a member of said permission class represents at least one permission to perform an action;
    wherein said permission class includes a validation method; and wherein said validation method, when invoked for a particular permission object belonging to said permission class, indicates whether a specified permission is encompassed by a permission represented by the particular permission object.

12. The computer readable medium of claim 11, wherein:

the step of establishing a permission class includes establishing a permission subclass that is a descendant of a permission super class; and the permission super class defines an interface of said validation method.

13. The computer readable medium of claim 12, further including one or more instructions for performing the steps of:

obtaining a first permission object, wherein said first permission object belongs to said permission subclass;

obtaining a second object, wherein said second object belongs to a descendent class of the permission super class; and determining whether a first permission represented by said first permission object encompasses a second permission represented by said second object by invoking a validation method associated with said first permission object.

14. The computer readable medium of claim 13, wherein:

the computer readable medium further includes one or more instructions for performing the step of receiving a request to perform a particular action; and the step of obtaining said second object includes the step of obtaining said second object based on said request to perform said particular action.

15. The computer readable medium of claim 14, wherein the step of determining whether said first permission represented by said first permission object encompasses said second permission represented by said second object includes sending to the validation method of said first object data that identifies the second object.

16. The computer readable medium of claim 12, further including one or more instructions for performing the steps of:

obtaining a first permission object, wherein said first permission object belongs to said permission subclass, wherein said first permission object specifies a first action and a first target;

obtaining a second object, wherein said second object belongs to a descendent class of the permission super class, wherein said second object specifies a second action and a second target; and determining whether a first permission represented by said first permission object encompasses a second permission represented by said second object by determining whether said first action encompasses said second action and determining whether said first target encompasses said second target.

17. The computer readable medium of claim 11, further including one or more instructions for performing the steps of obtaining a permission collection object associated with a plurality of permission objects, wherein said permission collection object includes a group validation method which, when invoked, indicates whether a specified permission is encompassed by at least one permission represented by said plurality of permission objects.

18. The computer readable medium of claim 11, wherein:

the step of establishing a permission class includes establishing a permission subclass that is a descendant of a permission super class; and the permission super class defines an interface of said validation method without providing an implementation for said validation method.

19. A computer system comprising:

a processor;

a memory coupled to said processor;

said processor being configured to establish a permission super class, wherein the permission super class defines an interface of a validation method; and said processor being configured to establish a permission subclass of the permission super class, wherein said permission subclass provides an implementation for said validation method, wherein said validation method, when invoked for a particular permission object belonging to said permission subclass, indicates whether a given permission is encompassed within a permission that is represented by said particular permission object.

20. The computer system of claim 19, wherein the permission super class defines said interface of said validation method without defining any implementation of the validation method.

21. The computer system of claim 19, wherein:

said processor is configured to create a first permission object in said memory;

said first permission object belongs to said permission subclass;

said processor is configured to create a second object in said memory, said second object belongs to a descendant class of the permission super class; and said processor is configured to determine whether a first permission represented by said first permission object encompasses a second permission represented by said second object by invoking a validation method associated with said first permission object.

22. The computer system of claim 21, wherein:

said processor is configured to receive a request to perform a particular action; and said processor is configured to create said second object by obtaining said second object based on said request to perform said particular action.

23. The computer system of claim 22, wherein said processor is configured to determine whether said first permission represented by said first permission object encompasses said second permission represented by said second object by passing as a parameter to the validation method of said first object data that identifies the second object.

24. The computer system of claim 19, wherein:

said processor is configured to create a first permission object in said memory;

said first permission object belongs to said permission subclass;

said first permission object specifies a first action and a first target;

said processor is configured to create a second object in said memory;

said second object belongs to a subclass of the permission super class;

said second object specifies a second action and a second target; and said processor is configured to determine whether a first permission represented by said first permission object encompasses a second permission represented by said second object by determining whether said first action encompasses said second action and determining whether said first target encompasses said second target.

* * * * *